Sept. 30, 1924.  J. B. JOBSON  1,510,322
PLOW
Filed Nov. 5, 1923
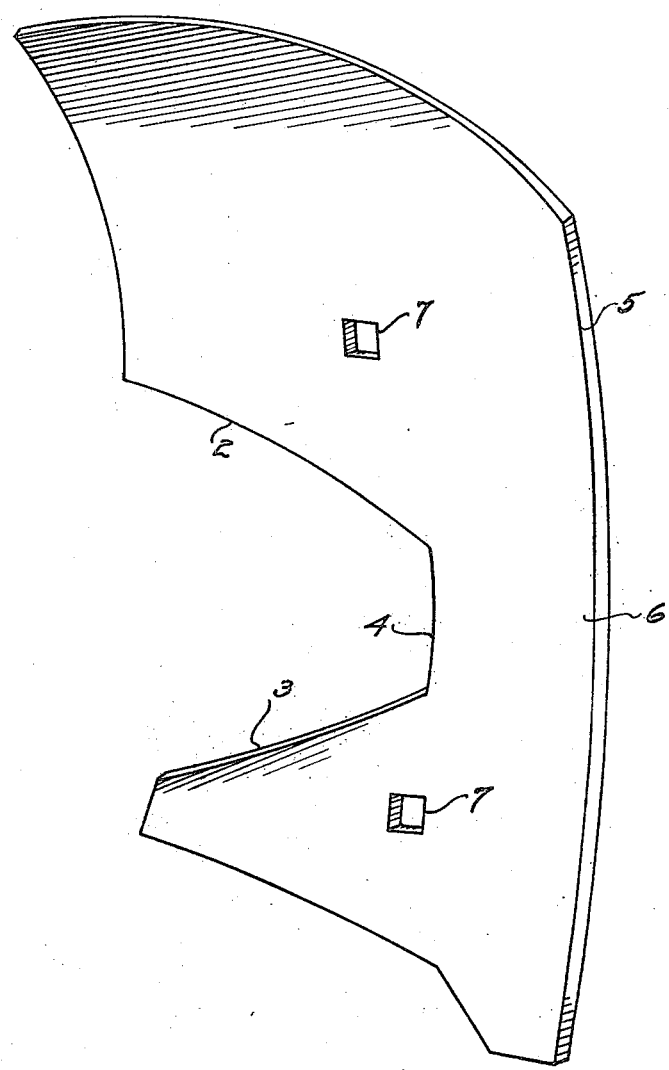

Patented Sept. 30, 1924.

1,510,322

UNITED STATES PATENT OFFICE.

JOHN B. JOBSON, OF ATLANTA, GEORGIA.

PLOW.

Application filed November 5, 1923. Serial No. 672,913.

*To all whom it may concern:*

Be it known that I, JOHN B. JOBSON, a citizen of the United States, residing at Atlanta, in the county of Fulton and State of Georgia, have invented new and useful Improvements in Plows, of which the following is a specification.

This invention relates to plow blades, and has for its object a comparatively simple inexpensive device of this character which in action will turn the earth or subsoil at a point below the ground surface, one which will also turn the earth or surface soil at the ground surface and deposit the surface soil thus turned onto the previously turned subsoil, thereby effecting a thorough breaking and turning of the earth with a consequent increase in efficiency of the plow, one wherein the blade will pass smoothly and readily through the ground and will plow deeper than another plow of same character on account of recess between wings.

With these and other objects in view, the invention comprises the novel features of construction more fully hereinafter described.

In the accompanying drawings, Fig. 1 is a perspective view of a plow-blade embodying the invention.

The plow complete will consist of throat 6. and land-slide with wings or moldboards attached and fastened at 7, by one or more bolts to each wing, and plow to be mounted on iron beam plow stock (not shown in drawing).

The plow blade is cut away or recessed at 4 at its left or furrow side at a point between its ends to form an upper wing or moldboard 2 and a lower wing or moldboard 3 which together adapt the wings for turning the soil, it being noted in this connection that the lower moldboard 3 travels at a depth below the ground-surface and slighty in advance of the top moldboard 2, which passes through the soil at a point adjacent the surface level, and, further, that by the provision of the recess the blades are adapted to pass more freely through the ground. The straight bottom edge of top moldboard 2 is to be sharpened same as bottom moldboard 3.

In practice, as the blades advance through the ground, the earth or subsoil below the ground surface will be turned by the subsoiling wing or moldboard 3, while the earth near the ground-surface will be turned by the upper wing or moldboard 2, onto the soil previously turned by the lower wing or plow-point.

It is to be particularly observed that by the improved device and owing to the provision of the upper and lower blades a double turning of the soil is effected, thus more thoroughly breaking the ground to render the plowing operation more effective, and, further, that by forming the V-shape recess between wings, the blades are adapted to travel through the ground more easily.

It will be understood, of course, that the features of improvement may, in so far as their operation is not affected one by the other, be embodied either singly or collectively in any form of plow to which they may be applicable.

Having thus described my invention, which I claim is:—

A plow-blade having one of its edges recessed to form a trapezoid and forming a pair of soil-turning wings or moldboards disposed one above the other and both curved laterally and forwardly with parallel straight slanting bottom edges, one of said wings being designed to turn the subsoil beneath the ground-surface, and the other to turn the surface-soil onto the subsoil.

In testimony whereof I affix my signature in the presence of two witnesses.

JOHN B. JOBSON.

Witnesses:
M. H. MILLARD,
H. T. CONNOLLY.